United States Patent
Boisture

(10) Patent No.: US 10,427,581 B2
(45) Date of Patent: Oct. 1, 2019

(54) TRAILER FOR LOADING AND UNLOADING HEAT EXCHANGER TUBE BUNDLES

(71) Applicant: Austin Industrial Services, LP, Dallas, TX (US)

(72) Inventor: Thomas B. Boisture, Baytown, TX (US)

(73) Assignee: Austin Industrial Services, LP, Dallas, TX (US)

( * ) Notice: Subject to any disclaimer, the term of this patent is extended or adjusted under 35 U.S.C. 154(b) by 22 days.

(21) Appl. No.: 15/688,723

(22) Filed: Aug. 28, 2017

(65) Prior Publication Data
US 2017/0355296 A1  Dec. 14, 2017

Related U.S. Application Data

(63) Continuation of application No. 14/454,233, filed on Aug. 7, 2014, now Pat. No. 9,764,676.

(51) Int. Cl.
*B60P 3/40* (2006.01)
*B60P 7/12* (2006.01)

(52) U.S. Cl.
CPC .. *B60P 3/40* (2013.01); *B60P 7/12* (2013.01)

(58) Field of Classification Search
CPC .. B60P 1/6409; B60P 1/64; B60P 1/00; B60P 3/40; B60P 3/00
See application file for complete search history.

(56) References Cited

U.S. PATENT DOCUMENTS

| | | | |
|---|---|---|---|
| 1,247,034 A | 11/1917 | Thompson | |
| 1,426,408 A | 8/1922 | Pezzetti | |
| 2,467,354 A | 4/1949 | Baldwin | |
| 3,185,519 A * | 5/1965 | Turnbull | B62D 25/2054 280/789 |
| 3,471,047 A | 10/1969 | Burke | |
| 3,614,153 A | 10/1971 | Tantlinger et al. | |
| 3,712,493 A | 1/1973 | Priefert | |
| 5,127,663 A | 7/1992 | Whitehead | |
| 6,516,694 B1 * | 2/2003 | Easton | B23D 45/126 269/17 |
| 7,794,188 B2 | 9/2010 | Whitehead et al. | |
| 2006/0067802 A1 * | 3/2006 | Abel | B60P 3/40 410/77 |

* cited by examiner

*Primary Examiner* — Glenn F Myers
(74) *Attorney, Agent, or Firm* — Norton Rose Fulbright US LLP

(57) ABSTRACT

An improved trailer for loading and unloading a heat exchanger tube bundle is disclosed. The trailer provides for the transport of tube bundles and includes seal pans which capture debris and other materials falling from the tube bundle during transport. The present invention also provides for the periodic placement of slideable supports under a bundle as it is pushed onto a trailer.

20 Claims, 8 Drawing Sheets

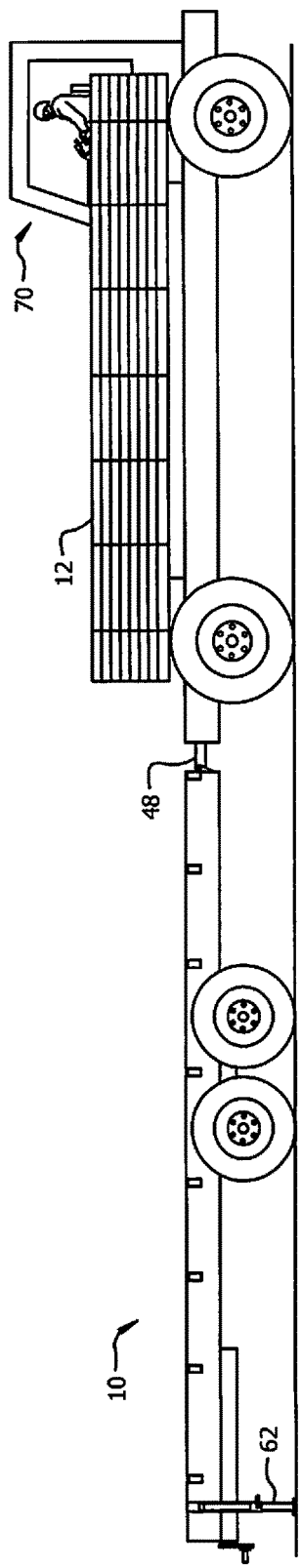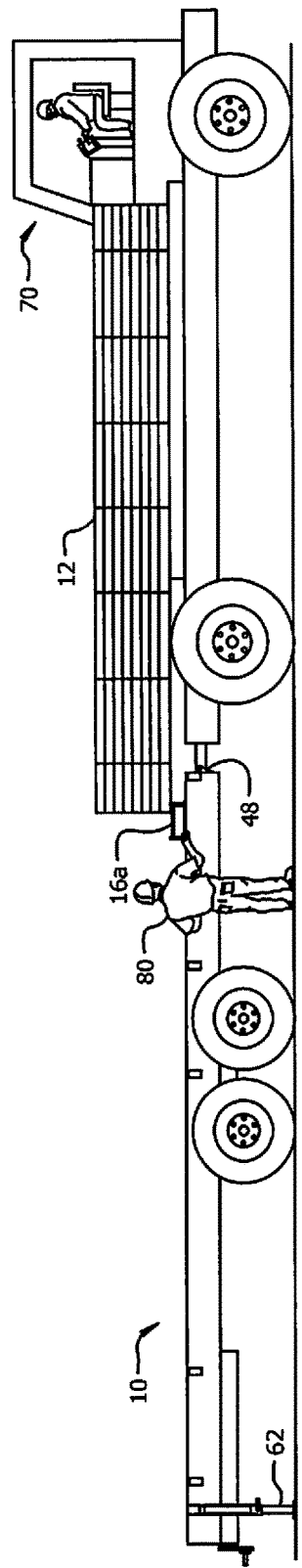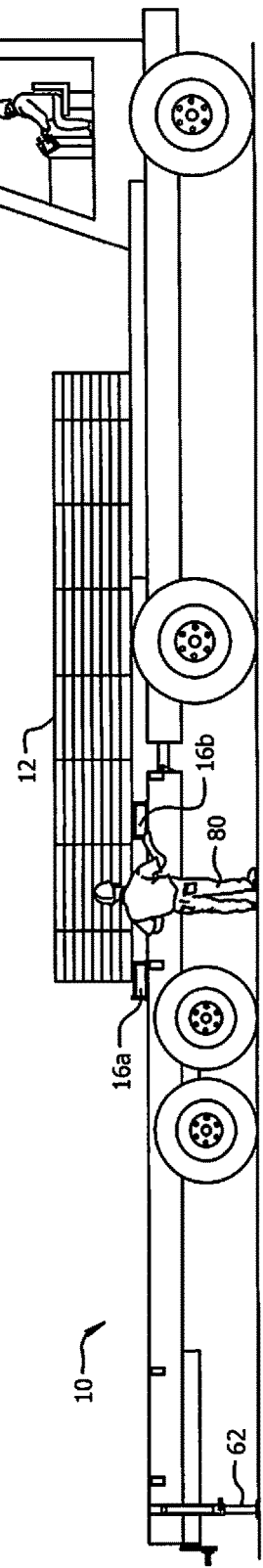

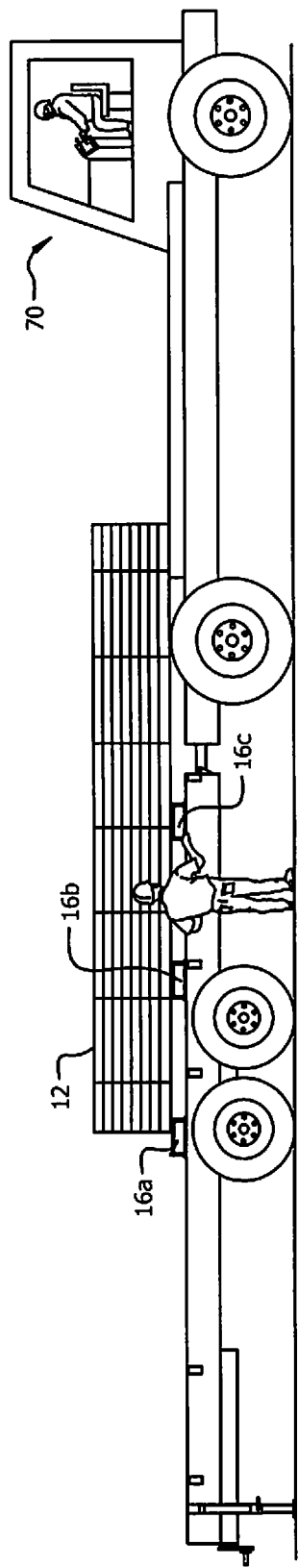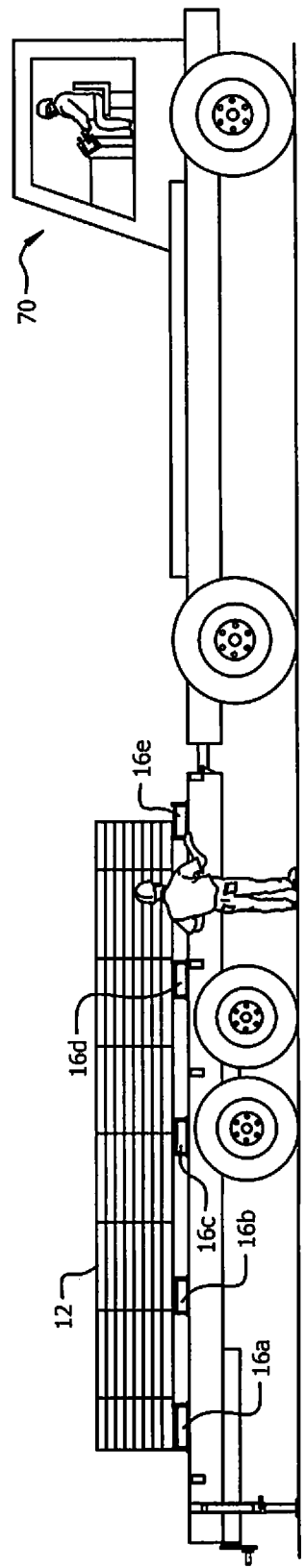

TRAILER FOR LOADING AND UNLOADING HEAT EXCHANGER TUBE BUNDLES

CROSS-REFERENCE TO RELATED APPLICATION

The present application is a continuation of U.S. patent application Ser. No. 14/454,233, filed Aug. 7, 2014 and entitled "TRAILER FOR LOADING AND UNLOADING HEAT EXCHANGER TUBE BUNDLES," issued Sep. 19, 2017 as U.S. Pat. No. 9,764,676 the disclosure of which is incorporated herein by reference it its entirety.

FIELD OF THE INVENTION

This invention relates to an apparatus for loading and unloading heat exchanger tube bundles. More particularly, this invention relates to an improved trailer for loading and unloading a heat exchanger tube bundle.

BACKGROUND OF THE INVENTION

Heat exchanger tube bundles are used for the transfer of heat from a fluid medium passing through a series of conduits. One of the fluids passes through a series of conduits, or tubes, while the other passes on the outside of the tubes. During this process, carbonaceous and calcareous deposits form on the interior of the individual tubes and debris and other dirt will collect on the surface of the individual tubes. Therefore, in order to maintain efficient operation of the facility it is necessary to periodically remove the tube bundles and clean them.

Before the tube bundles can be cleaned it is necessary to extract the tube bundle from an outer shell of the heat exchanger. Due to the large size of heat exchanger tube bundles, it is frequently necessary to transport the tube bundle a short distance within a given location, such as a refinery, to a designated cleaning site. In the prior art technique to transport the bundle it must first be lifted from the extractor with a large crane sue to its weight and bulk size and then placed on a trailer for transport to a cleaning site. Crane costs are high and add to the cost of maintaining heat exchangers. Additionally, crane availability may be an issue and may cause delays in getting the bundles transported to a cleaning site.

Therefore, the need exists for an improved trailer which is capable of being loaded without the need of a crane to handle the bundle.

SUMMARY OF THE INVENTION

Briefly, the invention relates to a trailer for loading and unloading a heat exchanger tube bundle having a base frame. The base frame includes substantially parallel longitudinal members. A wheel-supporting assembly is in contact with the base frame proximate the rear end of the trailer and is configured to provide a low profile for ease of loading and unloading a tube bundle. An elongated seal pan assembly is positioned adjacent to the longitudinal members to capture debris falling off the tube bundle during transport. At least two slideable support member is adapted to be slid along the top of substantially the entire length of the longitudinal members to ease the loading and unloading of the tube bundle. Connectors proximate the rear end of the longitudinal members may be included to permit the trailer to be connected to an extractor, thereby permitting the extractor to move the bundle relative to the trailer for placement of the bundle onto, or removal from, the trailer.

The foregoing has outlined rather broadly the features and technical advantages of the present invention in order that the detailed description of the invention that follows may be better understood. Additional features and advantages of the invention will be described hereinafter which also form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In order to fully understand the drawings used in the detailed description of the present invention, a brief description of each drawing is provided:

FIGS. 9A-9E are operational views of the present invention.

DETAILED DESCRIPTION OF THE INVENTION

Figure 1:
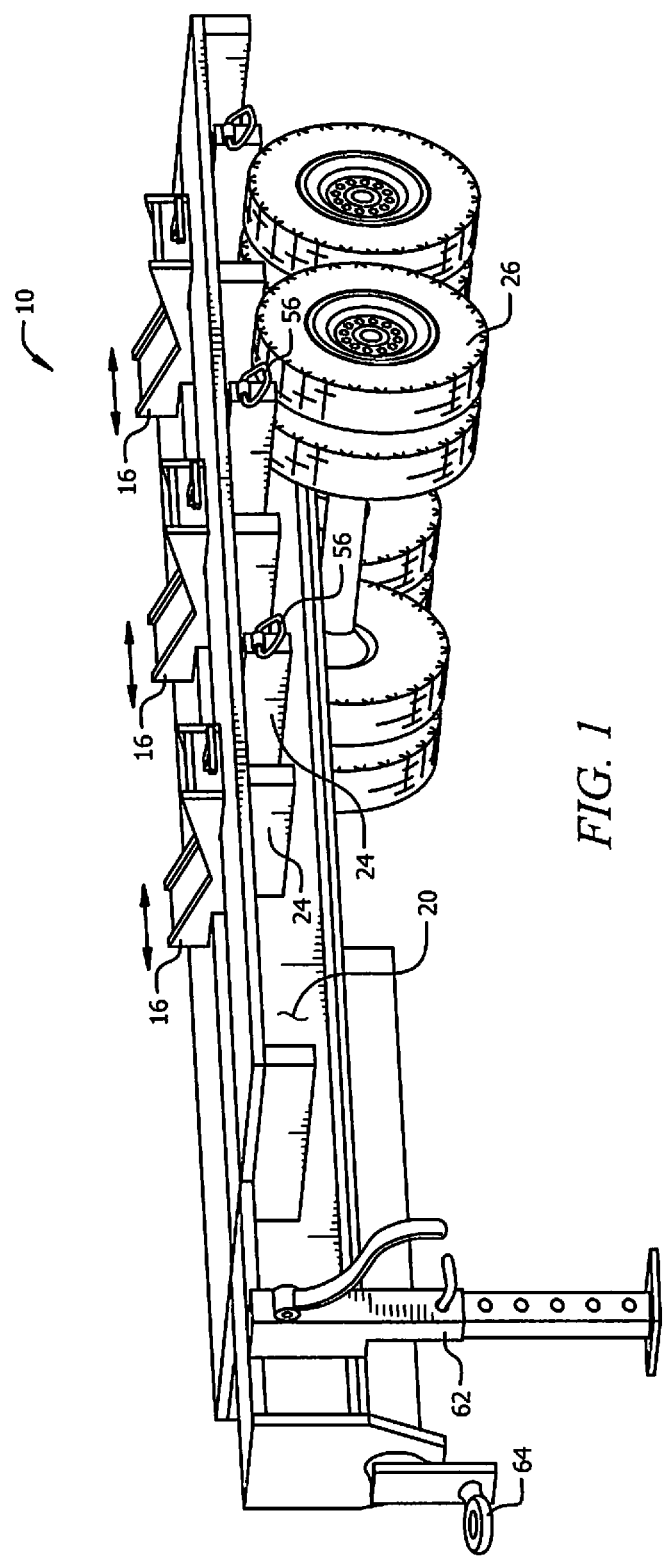
FIG. 1 is a perspective view of the present invention.
Figure 2:
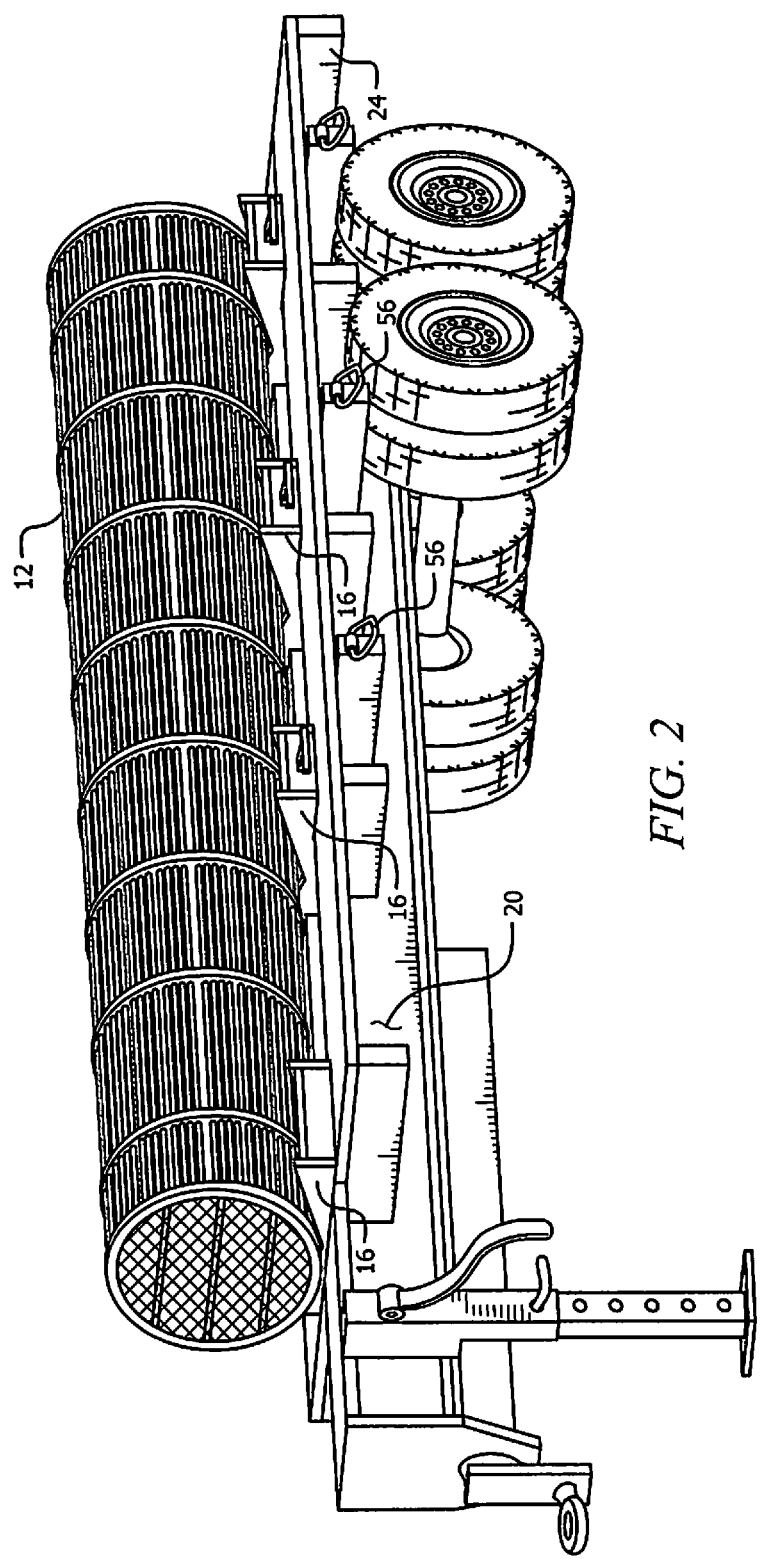
FIG. 2 is a perspective view of the present invention with a tube bundle.

Referring to FIGS. 1 and 2, perspective views of the present invention are shown comprising a trailer 10, adapted to transport a tube bundle 12. Tube bundle 12 is supported along its length by one or more slideable bundle supports 16 which are moveable in the directions of arrows 60.

Figure 3:
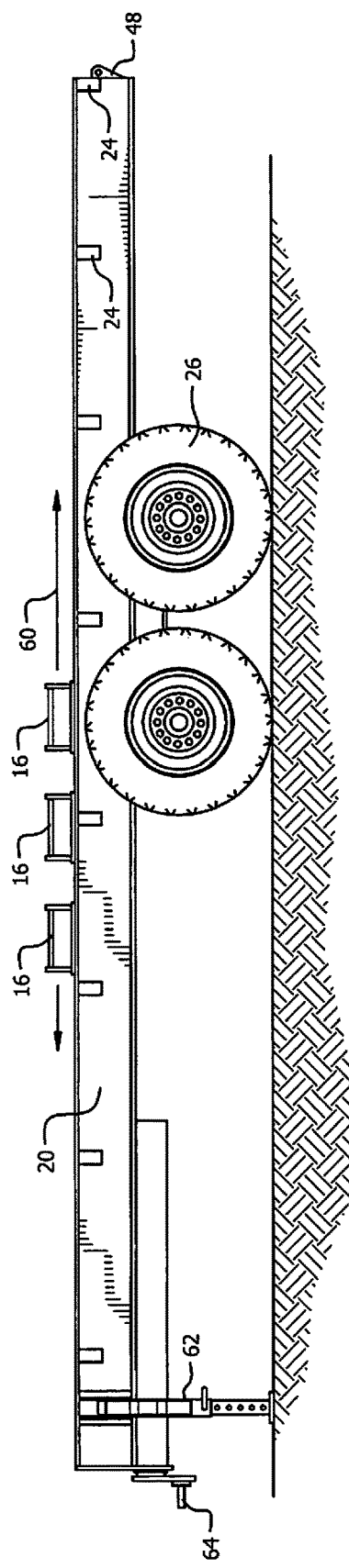
FIG. 3 is an elevation view of the present invention.
Figure 4:
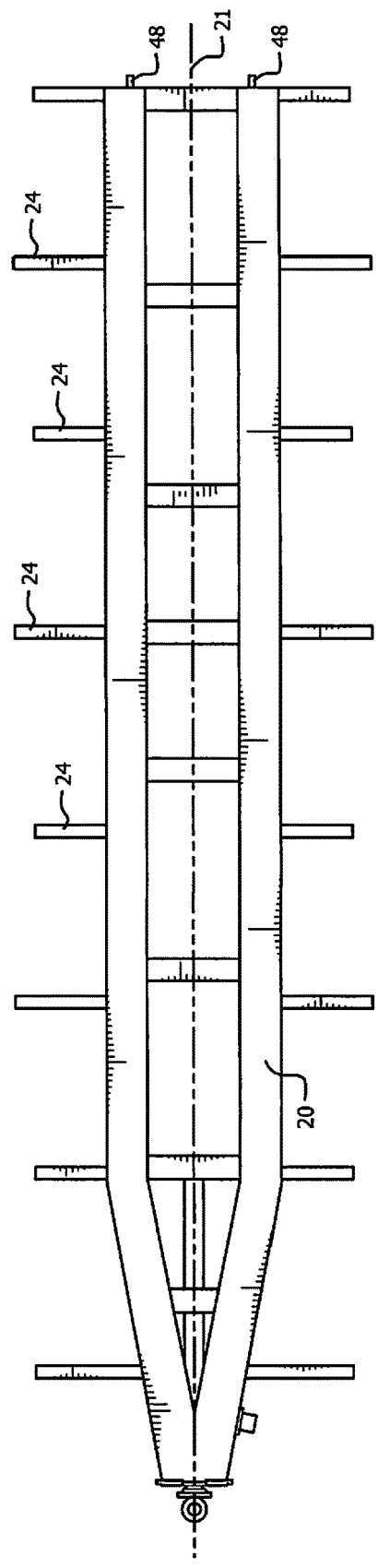
FIG. 4 is a top view of the base frame of the present invention.

Referring also to FIGS. 3 and 4, trailer 10 comprises a base 18 having longitudinal members 20 which extend along the longitudinal axis 21 of trailer 10. Interspersed between the longitudinal members 20 are transverse spacer beams 23 and outrigger members 24. A wheel assembly 26 is mounted toward the rear end of trailer 10 and provides mobile support while the trailer is being towed. The trailer may include a front jack 62 which is used when the trailer is in a stationary position. A front end eye-connector 64 is positioned at the front to engage a hook or other male-type connector so that the trailer may be towed.

Figure 5:
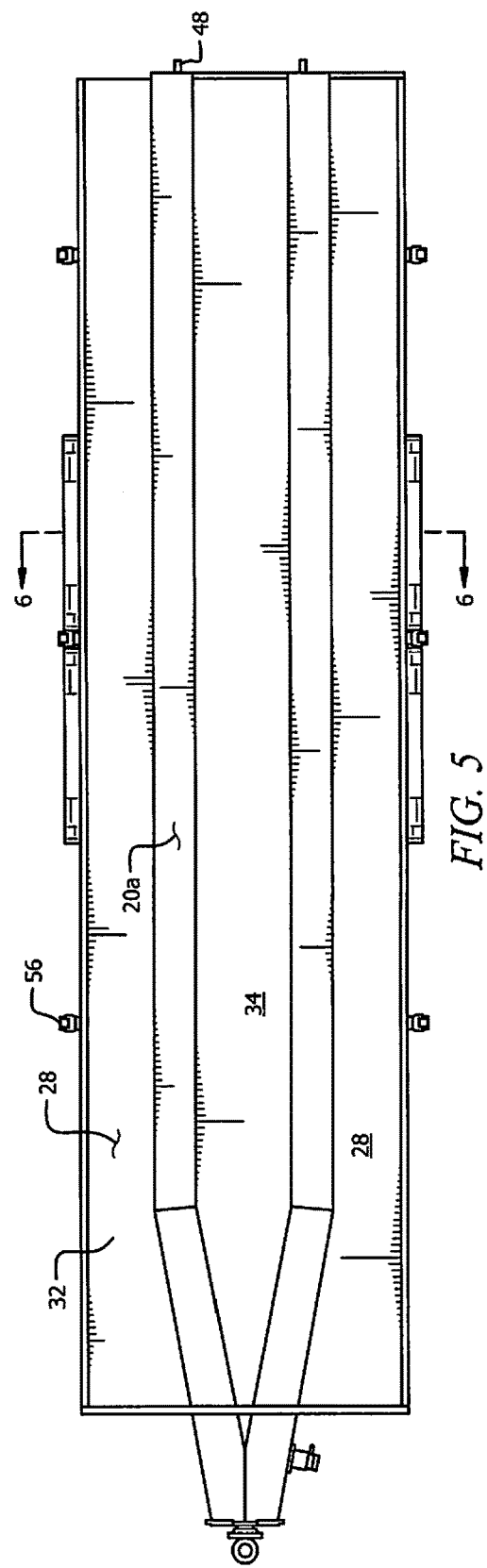
FIG. 5 is a top view of the present invention.
Figure 6:
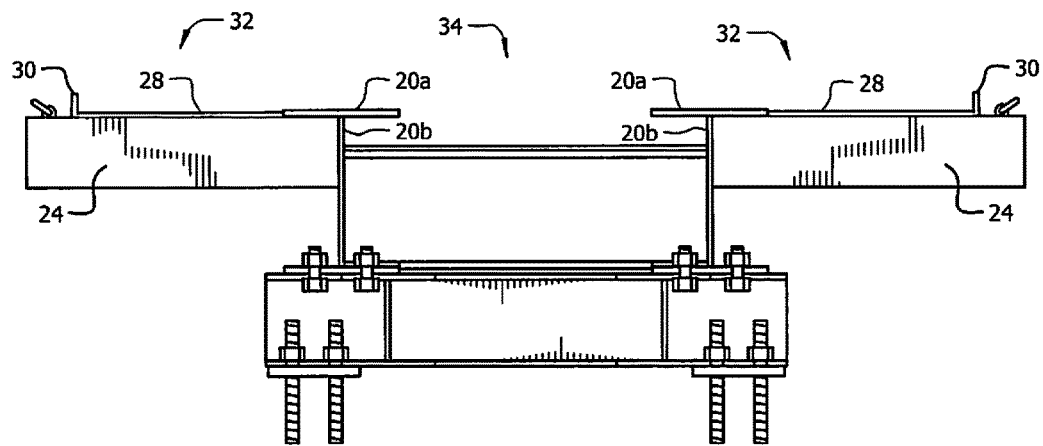
FIG. 6 is a cross-sectional view taken along line 6-6 of FIG. 5 without the wheel assembly.

Referring also now to FIGS. 5-6, a top view of trailer 10 is shown having horizontal outrigger plates 28 which are attached along one side to the top flange 20A. An outer vertical plate 30 is attached to the outer edge of each plate 28 thereby creating an outer seal pan 32 which may capture debris and other materials falling from the tube bundle during transport. Referring still to FIGS. 5 and 6, an interior horizontal plate 34 is positioned between longitudinal members 20. It is connected to the web 20B of each longitudinal member 20. Thus, plate 34 in combination with the web portion 20B of each longitudinal member serves to create an interior seal pan to capture debris and other materials falling from the tube bundle during transport.

Referring back to FIGS. 1 and 3, slideable supports 16 are shown positioned between and along the length of the longitudinal members 20. This permits supports 16 to more evenly carry the distributed load of the bundle and when loading or unloading a bundle to slide freely along the longitudinal axis 21 as discussed in more detail below.

Figure 7:
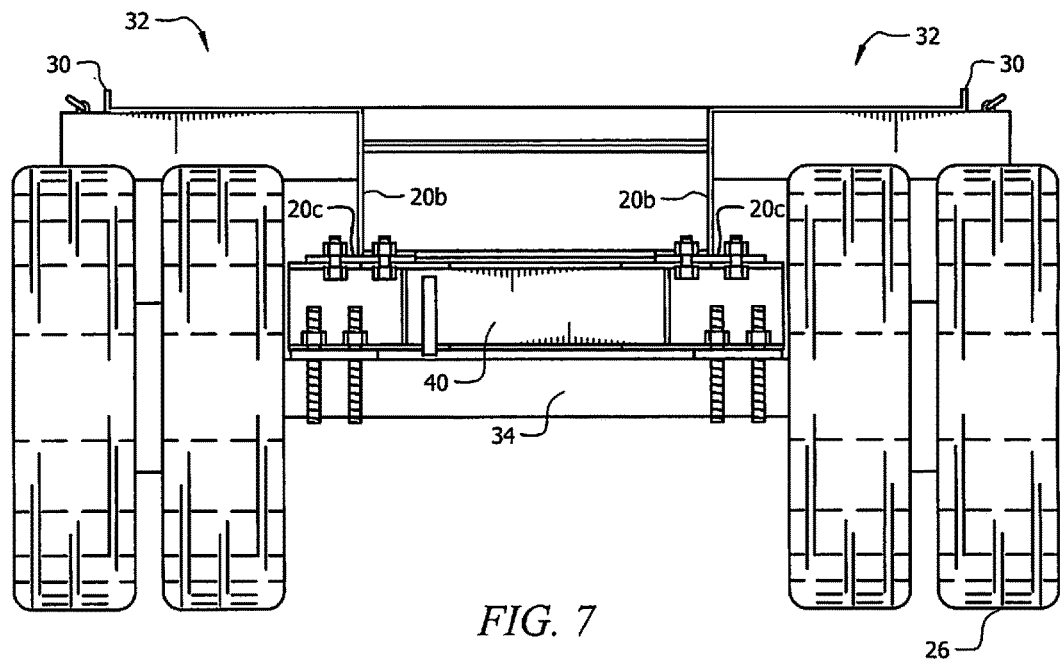
FIG. 7 is a cross-sectional view taken along line 6-6 of FIG. 5.

FIG. 7 is a cross section view taken along line 6-6 of FIG. 5 showing the wheel assembly 26 attached to longitudinal members 20. Using conventional techniques well known to those skilled in the art, the wheel assembly 26 includes an axle 34 which may be clamped by brackets 36 to a subassembly 38. Subassembly 38 comprises a transverse beam member 40 which is shown bolted to the bottom flange 20C of longitudinal members 20. The overall height of the wheel assembly is minimized using the smallest size wheels/tires and transverse beam 40 possible. Since the trailer is preferably used on a restricted site, such as a refinery, the trailer may not have to meet minimum DOT and/or state requirements for use on a public road or highway. Thus, a lower profile for the trailer is achievable, which is preferable in the operation of the invention since some outer shells housing heat exchangers are at ground level.

Figure 8A:
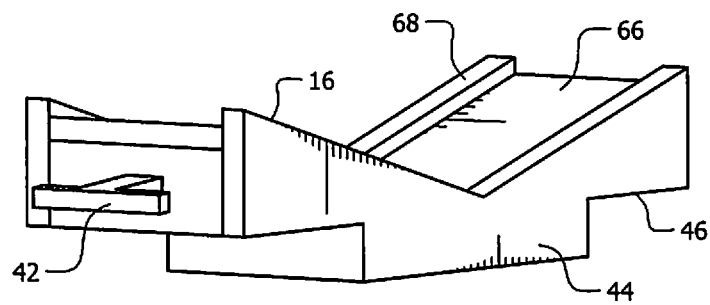
FIGS. 8A and 8B are perspective views of a portion of the present invention.
Figure 8B:
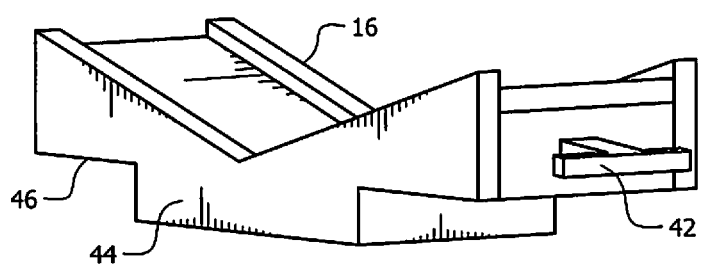

Referring now to FIGS. 8A and 8B, slideable support 16 is shown in a perspective view. Each slideable support is fabricated of a series of plates as shown including side plates 68 extending slightly above inclined plates 66. The support may also include a handle 42 on either end which enables the operator to raise or lower, and reposition, the slideable support as necessary. Each side plate 68 also includes an indented portion 44 which sits between the two longitudinal members 20 and a flat portion 46 which serves to sit or rest on top of flange 20A of each longitudinal member 20. It will be apparent to one of ordinary skill in the art that such a support may easy slide in the directions of arrows 60 (FIG. 3) in the operation of the present invention. If necessary a lubricant may be used on the top of flanges 20A so that the supports 16 are more easily slideable along longitudinal members 20 particularly when a bundle is being loaded or off-loaded from the trailer as described herein.

Referring back to FIG. 4, the trailer also includes connectors 48 attached to the rear end 50 of the trailer that enable an extractor to affix itself to rear end 50 so that the trailer does not move relative to the extractor as the bundle is moved relative to the trailer during loading or unloading. Such may be necessary as the load required to get a bundle to start moving out of the shell or following a resting period on the trailer can be significant.

Referring now to FIGS. 9A through 9E, in the operation of the present invention, a traditional extractor 70, well known to those skilled in the art, is maneuvering a bundle 12 which was previously extracted from a shell (not shown). The extractor positions itself at the rear end of trailer 10 and connects via connectors 48. In this manner, trailer 10 and extractor 70 act as a single body relative to bundle 12. Once connected, the bundle 12 which is supported on a moveable carriage assembly (not shown but well known to those skilled in the art) within extractor 70 advances the bundle forward onto trailer 10. As the bundle advances onto trailer 10, an operator 80 places a first slideable support 16A beneath the front end of the bundle 12. As the bundle advances forward as shown in FIGS. 9C-9E, the operator 80 continues to periodically introduce another slideable support 16B-E under the bundle 12 to support it as it advances forward onto trailer 10. After the bundle if fully loaded onto the trailer, come-alongs or straps may be attached over the bundle and connected to side connectors 56. For the removal of a bundle 12 from a trailer 10, the process described above is simply reversed. That is, an extractor 70 would connect to the trailer 10 and engage bundle 12. The extractor would then pull bundle 12 off trailer 10 onto a carriage assembly within the extractor 70. As the tube bundle advanced back onto the extractor, an operator 80 would remove each slideable support 16A-E from under bundle 12 as it advanced onto the extractor.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A trailer for transporting a heat exchanger bundle comprising:
   a base frame comprising at least a first longitudinal support member and a second longitudinal support member;
   a wheel assembly coupled to the base frame;
   a seal pan configured to capture debris falling from the heat exchanger bundle, the seal pan comprising:
      a central plate positioned between the first longitudinal support member and the second longitudinal support member and extending along a length of the base frame, wherein the central plate is positioned below a top surface of the first longitudinal support member and below a top surface of the second longitudinal support member, and wherein the central plate, the first longitudinal support member and the second longitudinal support member define a channel; and
      at least two slide plates configured to slidably engage the trailer to support the heat exchanger bundle during transport, wherein a bottom surface of each of the at least two slide plates comprises: an indented portion, a first flat portion on a first side of the indented portion, and a second flat portion on a second side of the indented portion, wherein each of the at least two slide plates is configured to interface with, and move longitudinally relative to, the trailer as the heat exchanger bundle is moved on or off the trailer, and wherein, as each of the at least two slide plates is interfaced with the trailer, the indented portion resides within the channel, the first flat portion slidably engages a top surface of the first longitudinal support member, and the second flat portion slidably engages a top surface of the second longitudinal support member.

2. The trailer of claim 1, further comprising a plurality of support members oriented transverse to the first longitudinal support member and the second longitudinal support member.

3. The trailer of claim 2, wherein the seal pan comprises:
a first outrigger plate extending along the length of the base frame, wherein the first outrigger plate is positioned adjacent an exterior lateral edge of the first longitudinal support member, and wherein the central plate is positioned adjacent an interior lateral edge of the first longitudinal support member; and
a second outrigger plate extending along the length of the base frame, wherein the second outrigger plate is positioned adjacent an exterior lateral edge of the second longitudinal support member, and wherein the central plate is positioned adjacent an interior lateral edge of the second longitudinal support member.

4. The trailer of claim 3, wherein the plurality of support members includes one or more interior support members, one or more first outrigger support members, and one or more second outrigger support members, the one or more interior support members configured to support at least the first longitudinal support member and the second longitudinal support member, the one or more first outrigger support members configured to support to at least the first outrigger plate, and the one or more second outrigger support members configured to support to at least the second outrigger plate.

5. The trailer of claim 1, further comprising one or more connectors configured to couple the trailer to a mobile heat exchanger bundle extractor to prohibit separation of the trailer from the mobile heat exchanger bundle extractor during placement of the heat exchanger bundle on, or removal from, the trailer.

6. The trailer of claim 1, wherein an upper surface of each of the at least two slide plates comprises a concave shape configured to cradle the heat exchanger bundle during placement of the heat exchanger bundle on, removal of the heat exchanger bundle from, or transport of the heat exchanger bundle while on, the trailer.

7. The trailer of claim 1, wherein each of said at least two slide plates comprises one or more handles.

8. A trailer for transporting a heat exchanger bundle comprising:
a base frame having at least a first longitudinal support member and a second longitudinal support member;
a wheel assembly coupled to the base frame;
a seal pan configured to capture debris falling from the heat exchanger bundle, the seal pan comprising:
a central plate positioned between the first longitudinal support member and the second longitudinal support member and extending along a length of the base frame, wherein the central plate is positioned below a top surface of the first longitudinal support member and below a top surface of the second longitudinal support member, and wherein the central plate, the first longitudinal support member and the second longitudinal support member define a channel along the length of the trailer; and
at least two slide plates configured to interface with, and move longitudinally relative to, the trailer, wherein a bottom surface of each of the at least two slide plates comprises: an indented portion, a first flat portion on a first side of the indented portion, and a second flat portion on a second side of the indented portion, wherein, as each of the at least two slide plates is interfaced with the trailer, the indented portion resides within the channel, the first flat portion slidably engages a top surface of the first longitudinal support member, and the second flat portion slidably engages a top surface of the second longitudinal support member, and wherein an upper surface of each of the at least two slide plates comprises a concave shape configured to support the heat exchanger bundle during placement of the heat exchanger bundle on, removal of the heat exchanger bundle from, or transport of the heat exchanger bundle while on, the trailer.

9. The trailer of claim 8, further comprising a plurality of support members oriented transverse to the first longitudinal support member and the second longitudinal support member.

10. The trailer of claim 9, wherein the seal pan comprises:
a first outrigger plate extending along the length of the base frame, wherein the first outrigger plate is positioned adjacent an exterior lateral edge of the first longitudinal support member, and wherein the central plate is positioned adjacent an interior lateral edge of the first longitudinal support member; and
a second outrigger plate extending along the length of the base frame, wherein the second outrigger plate is positioned adjacent an exterior lateral edge of the second longitudinal support member, and wherein the central plate is positioned adjacent an interior lateral edge of the second longitudinal support member.

11. The trailer of claim 10, wherein the plurality of support members includes one or more interior support members, one or more first outrigger support members, and one or more second outrigger support members, the one or more interior support members configured to support at least the first longitudinal support member and the second longitudinal support member, the one or more first outrigger support members configured to support to at least the first outrigger plate, and the one or more second outrigger support members configured to support to at least the second outrigger plate.

12. The trailer of claim 8, further comprising one or more connectors configured to couple the trailer to a mobile heat exchanger bundle extractor to prohibit separation of the trailer from the mobile heat exchanger bundle extractor during placement of the heat exchanger bundle on, or removal from, the trailer.

13. The trailer of claim 8, wherein each of said at least two slide plates comprises one or more handles.

14. A trailer for transporting a heat exchanger bundle comprising:
a base frame having at least a first longitudinal support member and a second longitudinal support member;
a wheel assembly in contact with the base frame;
a seal pan configured to capture debris falling from the heat exchanger bundle, the seal pan comprising:
a central seal pan comprising a central plate positioned between an interior edge of the first longitudinal support member and an interior edge of the second longitudinal support member and extending along a length of the base frame, wherein the central plate is positioned below a top surface of the first longitudinal support member and below a top surface of the second longitudinal support member, and wherein the central plate, the first longitudinal support member and the second longitudinal support member define a channel along the length of the trailer;

a first exterior seal pan comprising a first outrigger plate extending along the length of the base frame, wherein the first outrigger plate is positioned adjacent an exterior lateral edge of the first longitudinal support member; and a second exterior seal pan comprising a second outrigger plate extending along the length of the base frame, wherein the second outrigger plate is positioned adjacent an exterior lateral edge of the second longitudinal support member; and a first vertical plate attached to the first exterior seal pan and a second vertical plate attached to the second exterior seal pan, wherein a first longitudinal edge of the first vertical plate is attached to the first exterior seal pan and a second longitudinal edge of the first vertical plate is open, wherein a first longitudinal edge of the second vertical plate is attached to the second exterior seal pan and a second longitudinal edge of the second vertical plate is open, and wherein the first vertical plate forms a vertical wall proximate to and extending above an exterior edge of the first exterior seal pan and the second vertical plate forms a vertical wall proximate to and extending above an exterior edge of the second exterior seal pan.

15. The trailer of claim 14, further comprising at least two slide plates configured to interface with, and move longitudinally relative to, the trailer, wherein a bottom surface of each of the at least two slide plates comprises: an indented portion, a first flat portion on a first side of the indented portion, and a second flat portion on a second side of the indented portion, and wherein, as each of the at least two slide plates is interfaced with the trailer, the indented portion resides within the channel, the first flat portion slidably engages a top surface of the first longitudinal support member, and the second flat portion slidably engages a top surface of the second longitudinal support member.

16. The trailer of claim 15, wherein an upper surface of each of the at least two slide plates comprises a concave shape configured to support the heat exchanger bundle during placement of the heat exchanger bundle on, removal of the heat exchanger bundle from, or transport of the heat exchanger bundle while on, the trailer.

17. The trailer of claim 15, wherein each of said at least two slide plates comprises one or more handles.

18. The trailer of claim 14, further comprising a plurality of support members oriented transverse to the first longitudinal support member and the second longitudinal support member.

19. The trailer of claim 18, wherein the plurality of support members includes one or more interior support members, one or more first outrigger support members, and one or more second outrigger support members, the one or more interior support members configured to support at least the first longitudinal support member and the second longitudinal support member, the one or more first outrigger support members configured to support to at least the first outrigger plate, and the one or more second outrigger support members configured to support to at least the second outrigger plate.

20. The trailer of claim 14, further comprising one or more connectors configured to couple the trailer to a mobile heat exchanger bundle extractor to prohibit separation of the trailer from the mobile heat exchanger bundle extractor during placement of the heat exchanger bundle on, or removal from, the trailer.

* * * * *